US010320968B2

United States Patent
Lin et al.

(10) Patent No.: US 10,320,968 B2
(45) Date of Patent: Jun. 11, 2019

(54) PROTECTION MODULE AND DECOUPLING COMPONENT THEREOF FOR SYMMETRICAL TWISTED PAIRS

(71) Applicant: NLIGHTNING TECHNOLOGY LTD., New Taipei (TW)

(72) Inventors: Kun Tsen Lin, New Taipei (TW); Shih Peng Wu, New Taipei (TW)

(73) Assignee: NLIGHTNING TECHNOLOGY LTD., New Taipei (TW)

( * ) Notice: Subject to any disclaimer, the term of this patent is extended or adjusted under 35 U.S.C. 154(b) by 271 days.

(21) Appl. No.: 15/099,349

(22) Filed: Apr. 14, 2016

(65) Prior Publication Data

US 2016/0308347 A1    Oct. 20, 2016

(30) Foreign Application Priority Data

Apr. 16, 2015   (TW) .............................. 104112203 A

(51) Int. Cl.
*H04M 3/18* (2006.01)

(52) U.S. Cl.
CPC ..................... *H04M 3/18* (2013.01)

(58) Field of Classification Search
CPC .......... H02H 1/04; H02H 9/041; H02H 9/045; H03H 7/09; H04M 3/18
See application file for complete search history.

(56) References Cited

U.S. PATENT DOCUMENTS

| 6,040,972 | A  | * | 3/2000  | Takeuchi | ............... | H02H 9/026 361/106 |
| 6,266,223 | B1 | * | 7/2001  | Curry    | ..................... | H02H 9/042 361/119 |
| 8,576,532 | B2 | * | 11/2013 | Straka   | .................... | H02H 9/041 361/119 |

* cited by examiner

*Primary Examiner* — Ronald W Leja
*Assistant Examiner* — Christopher J Clark
(74) *Attorney, Agent, or Firm* — Masuvalley & Partners

(57) ABSTRACT

A protection module and a decoupling component thereof for symmetrical twisted pairs are provided. The protection module includes an input interface, an output interface, a ground interface, a first protection element, the decoupling component and a second protection element. The decoupling component has an inductor, first and second resistors, and first to fifth contacts. The inductor and the first resistor are coupled in series between the third contact and the fourth contact. The inductor and the second resistor are coupled in series between the third contact and the fifth contact. The first contact is located between the inductor and the first resistor. The second contact is located between the inductor and the second resistor. The first and second contacts are coupled to the input interface. The third contact is coupled to the ground interface through the first protection element. The fourth and fifth contacts are coupled to the output interface.

8 Claims, 6 Drawing Sheets

PROTECTION MODULE AND DECOUPLING COMPONENT THEREOF FOR SYMMETRICAL TWISTED PAIRS

This application claims priority to Taiwan Patent Application No. 104112203 filed on Apr. 16, 2015 which is hereby incorporated by reference in its entirety.

CROSS-REFERENCES TO RELATED APPLICATIONS

Not applicable.

BACKGROUND OF THE INVENTION

Field of the Invention

The present invention relates to a protection module and a decoupling component thereof for symmetrical twisted pairs. More particularly, the protection module of the present invention is connected between two devices through the symmetrical twisted pairs to provide the overvoltage protection function. Moreover, the decoupling component in the protection module of the present invention can solve the problem that the protection module affects the signal transmission.

Descriptions of the Related Art

With the vigorous development of the communication science and technologies, applications of using symmetrical twisted pairs for signal transmission have become ubiquitous in people's daily life. For example, the symmetrical twisted pairs are most commonly used in local telephones and network modems as transmission media for connection to nearby distribution boxes. However, for signals input by the symmetrical twisted pairs, the local telephones and the network modems usually do not have the surge protection function that can prevent voltage surges generated by lightning strikes and static electricity in the environment or by power on-off actions.

Accordingly, an urgent need exists in the art to provide a protection module for symmetrical twisted pairs, which can provide an overvoltage protection function for devices connected thereto without affecting the signal transmission.

SUMMARY OF THE INVENTION

An objective of the present invention is to provide a protection module for symmetrical twisted pairs, which can provide an overvoltage protection function for devices connected thereto without affecting the signal transmission.

To achieve the aforesaid objective, the present invention discloses a protection module for symmetrical twisted pairs. The protection module comprises an input interface, an output interface, a ground interface, a first protection element, a decoupling component and a second protection element. The input interface has a positive input terminal and a negative input terminal. The output interface has a positive output terminal and a negative output terminal. The ground interface has a ground terminal. The decoupling component has an inductor, a first resistor, a second resistor, a first contact, a second contact, a third contact, a fourth contact and a fifth contact. The inductor and the first resistor are coupled in series between the third contact and the fourth contact. The inductor and the second resistor are coupled in series between the third contact and the fifth contact. The first contact is located between the inductor and the first resistor. The second contact is located between the inductor and the second resistor. The first contact is coupled to the positive input terminal through a first transmission line. The second contact is coupled to the negative input terminal through a second transmission line. The third contact is coupled to the ground terminal through a third transmission line and the first protection element. The fourth contact is coupled to the positive output terminal through a fourth transmission line. The fifth contact is coupled to the negative output terminal through a fifth transmission line. The second protection element is coupled between the fourth transmission line and the fifth transmission line.

Moreover, the present invention further discloses a decoupling component. The decoupling component comprises a first pin, a second pin, a third pin, a fourth pin, a fifth pin, an inductor, a first resistor, and a second resistor. The inductor and the first resistor are coupled in series between the third pin and the fourth pin. The inductor and the second resistor are coupled in series between the third pin and the fifth pin. The first pin is located between the inductor and the first resistor. The second pin is located between the inductor and the second resistor.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The following embodiments are intended to illustrate the technical content of the present invention rather than to limit scope of the present invention. It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
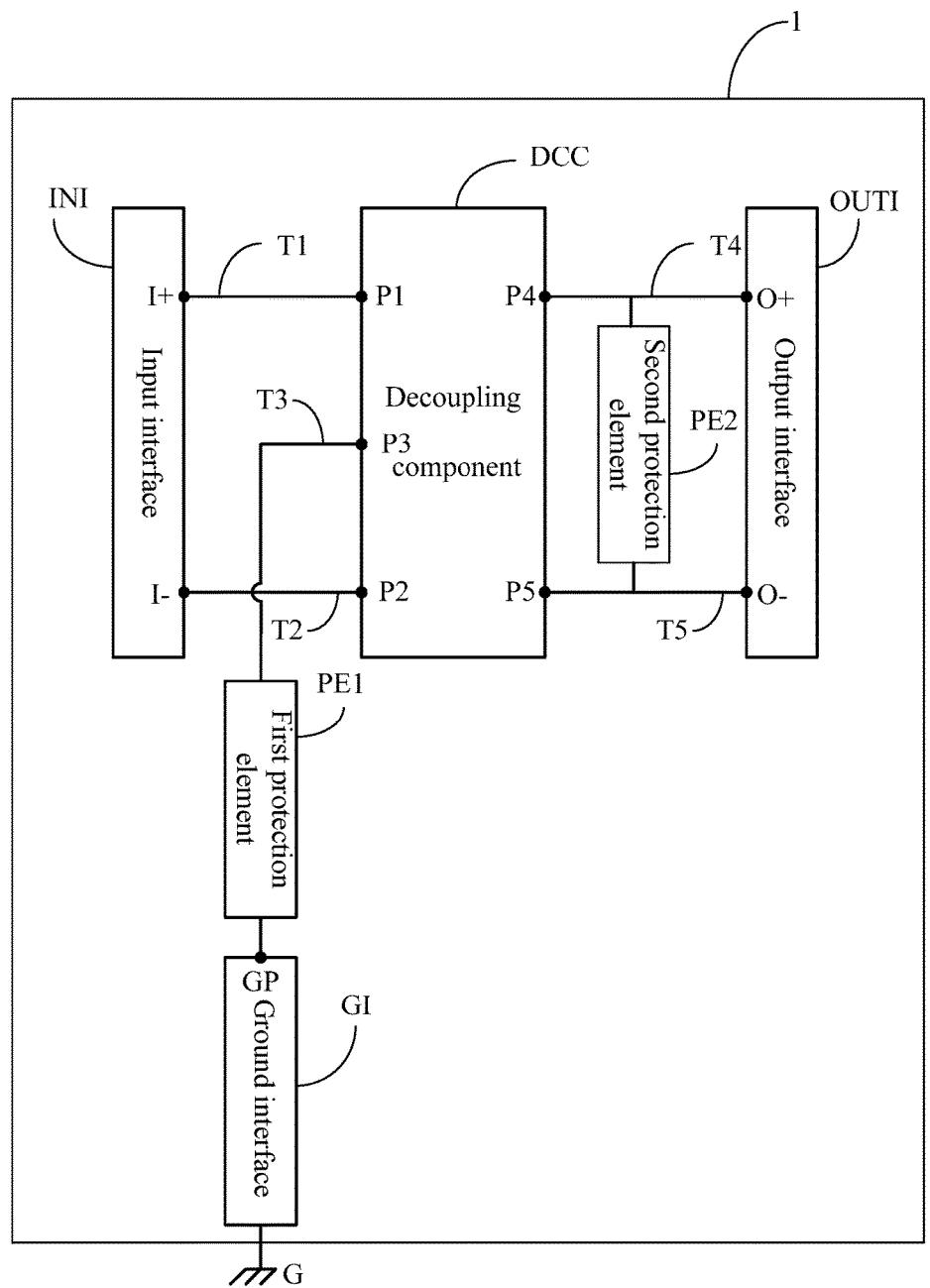
FIG. 1 is a schematic view of a protection module 1 according to a first embodiment of the present invention.

A first embodiment of the present invention is as shown in FIG. 1, which is a schematic view of a protection module 1 of the present invention. The protection module 1 is configured to bridge symmetrical twisted pairs (hereinafter called twisted pairs). The protection module 1 comprises an input interface INI, an output interface OUTI, a ground interface GI, a first protection element PE1, a decoupling component DCC and a second protection element PE2. In this embodiment, the protection module 1 may be implemented by integrating the input interface INI, the output interface OUTI, the ground interface GI, the first protection element PE1, the decoupling component DCC and the second protection element PE2 into a printed circuit board.

However, the implementation of the protection module 1 is not intended to limit the claimed scope of the present invention.

The input interface INI has a positive input terminal I+ and a negative input terminal I− so as to receive an input signal from a twisted pair connected thereto. The output interface OUT1 has a positive output terminal O+ and a negative output terminal O− so as to output an output signal to a twisted pair connected thereto. The ground interface GI has a ground terminal GP, through which the protection module 1 can be connected to an external ground terminal G via a conductor.

The first protection element PE1 is coupled between the decoupling component DCC and the ground interface GI. The decoupling component DCC is coupled to the input interface INI through a first transmission line T1 and a second transmission line T2, coupled to the ground interface GI through a third transmission line T3 and the first protection element PE1, and coupled to the output interface OUT1 through a fourth transmission line T4 and a fifth transmission line T5. The second protection element PE2 is coupled between the fourth transmission line T4 and the fifth transmission line T5.

Figure 2A:
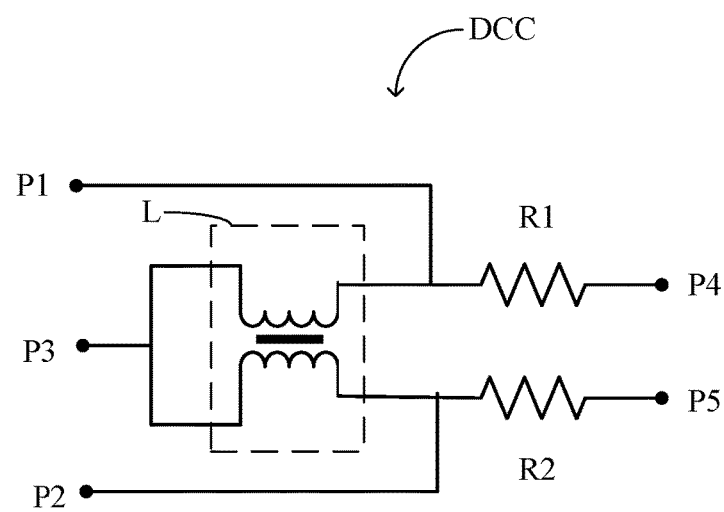
FIG. 2A to FIG. 2B are respectively schematic views of a decoupling component DCC of the present invention.
Figure 2B:
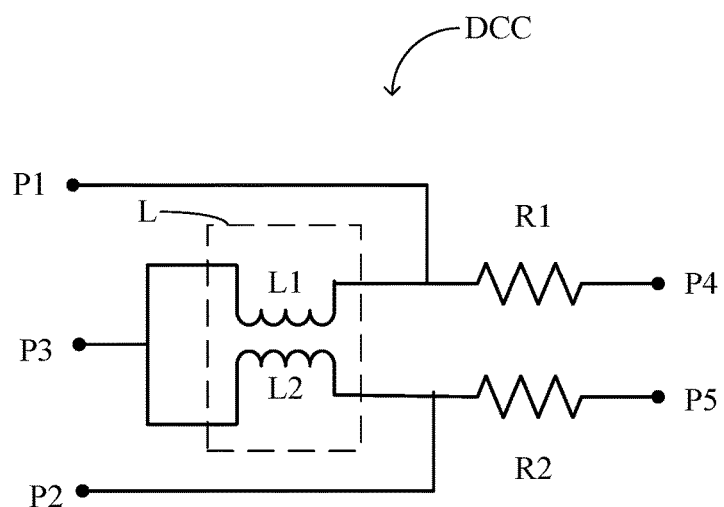
Figure 3A:
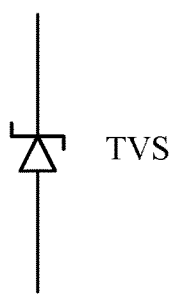
FIG. 3A to FIG. 3D are respectively schematic views of a first protection element PE1 of the present invention.
Figure 3B:
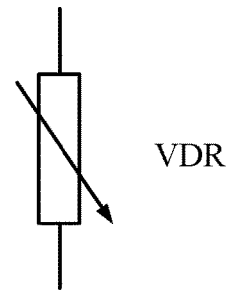
Figure 3C:
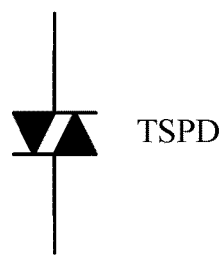
Figure 3D:
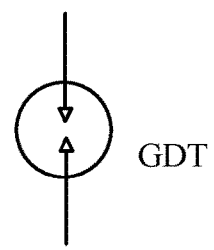

As shown in FIG. 2A to FIG. 2B, the decoupling component DCC has an inductor L, a first resistor R1, a second resistor R2, a first contact P1, a second contact P2, a third contact P3, a fourth contact P4, and a fifth contact P5. The inductor L and the first resistor R1 are coupled in series between the third contact P3 and the fourth contact P4. Moreover, the inductor L and the second resistor R2 are coupled in series between the third contact P3 and the fifth contact P5. The first contact P1 is located between the inductor L and the first resistor R1. The second contact P2 is located between the inductor L and the second resistor R2.

The first contact P1 is coupled to the positive input terminal I+ through a first transmission line T1, and the second contact P2 is coupled to the negative input terminal I− through a second transmission line T2. The third contact P3 is coupled to the ground terminal GP through the third transmission line T3 and the first protection element PE1. The fourth contact P4 is coupled to the positive output terminal O+ through the fourth transmission line T4, and the fifth contact P5 is coupled to the negative output terminal O− through a fifth transmission line T5.

The inductor L may be a coupling inductor, as shown in FIG. 2A. The inductance of the inductor L ranges between 50 microhenry (μH) and 400 μH. Furthermore, the inductor L may also consist of a first inductor L1 and a second inductor L2, as shown in FIG. 2B. The first inductor L1 and the first resistor R1 are coupled in series between the third contact P3 and the fourth contact P4, and the second inductor L2 and the second resistor R2 are coupled in series between the third contact P3 and the fifth contact P5. Inductances of the first inductor L1 and the second inductor L2 also range between 50 μH and 400 μH.

Figure 4:
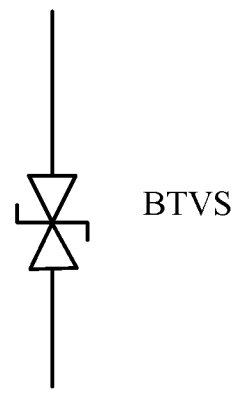
FIG. 4 is a schematic view of a second protection element PE2 of the present invention.

As shown in FIG. 3A to FIG. 3D, the first protection element PEI may be one of a one-way transient voltage suppression (TVS) diode TVS, a varistor VDR, a semiconductor discharge tube TSPD, and a gas discharge tube GDT. Moreover, as shown in FIG. 4, the second protection element PE2 may be a two-way TVS diode.

Figure 5:
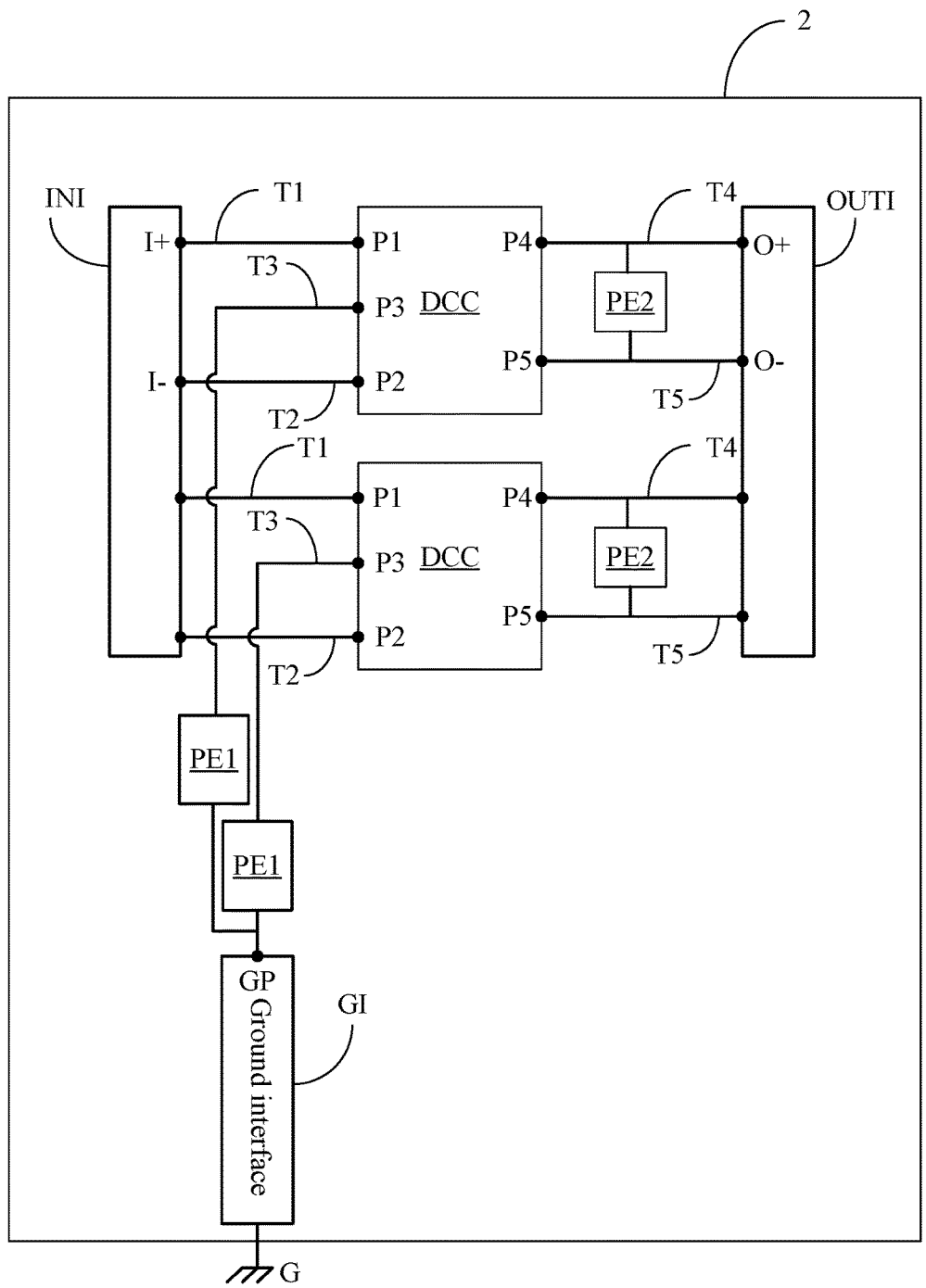
FIG. 5 is a schematic view of a protection module 2 according to an embodiment of the present invention.

It shall be appreciated that, the aforesaid embodiment is illustrated with the assumption that the protection module 1 receives the signal from a twisted pair and outputs the signal to a twisted pair. However, as can be readily appreciated by those of ordinary skill in the art, when the protection module 1 is used for a cable formed by multiple twisted pairs, the same effect can be achieved simply by repeatedly arranging the elements of FIG. 1. For example, as shown in FIG. 5, the protection module 2 may receive the signal from two twisted pairs and output the signal to two twisted pairs.

Figure 6A:
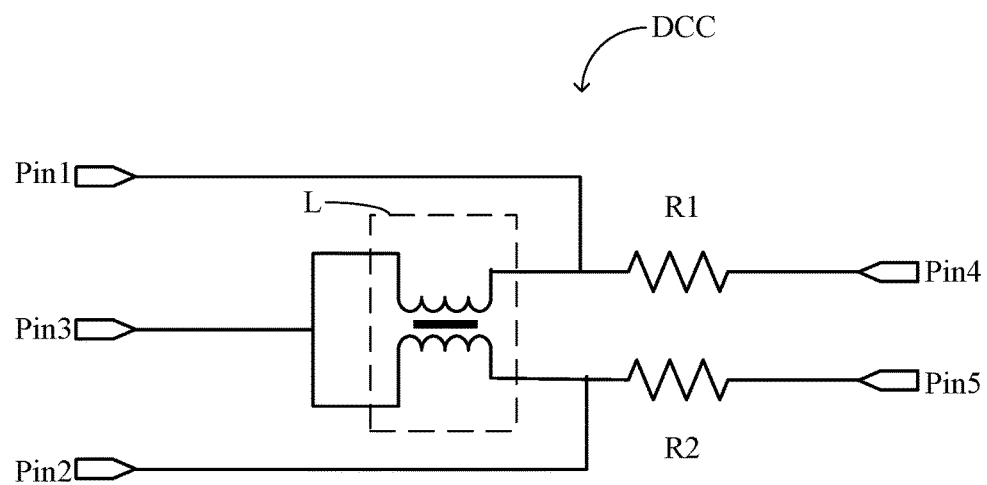
FIG. 6A to FIG. 6B are respectively schematic views of a decoupling component DCC according to a second embodiment of the present invention.
Figure 6B:
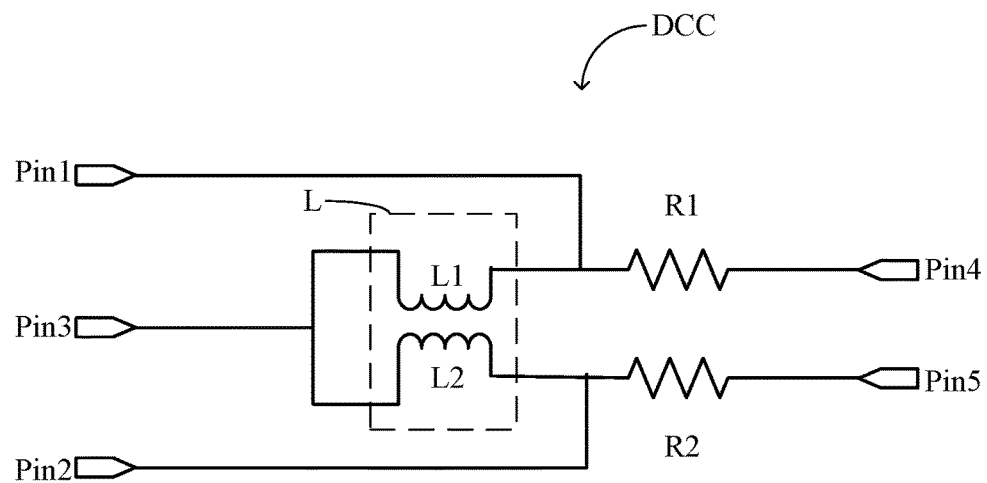

A second embodiment of the present invention is as shown in FIG. 6A to FIG. 6B, which are schematic views of a decoupling component DCC of the present invention. The decoupling component DCC is for use in the protection module 1 of the first embodiment. In detail, instead of integrating the decoupling component DCC in the form of discrete elements into the protection module 1, the decoupling component DCC may also first be integrated into a single element and then placed within the protection module 1. The inductor L, the first resistor R1 and the second resistor R2 of the decoupling component DCC may be packaged into a single element by using the semiconductor packaging technology, or they may be integrated onto a same silicon substrate by using the semiconductor manufacturing technology and then packaged into a single element.

The decoupling component DCC comprises a first pin Pint, a second pin Pin2, a third pin Pin3, a fourth pin Pin4, a fifth pin Pin5, an inductor L, a first resistor R1, and a second resistor R2. The inductor L and the first resistor R1 are coupled in series between the third pin Pin3 and the fourth pin Pin4, and the inductor L and the second resistor R2 are coupled in series between the third pin Pin3 and the fifth pin Pin5. The first pin Pin1 is located between the inductor L and the first resistor R1, and the second pin is located between the inductor L and the second resistor R2. Similarly, the coupling L may be a coupling inductor as shown in FIG. 6A, or may consist of a first inductor L1 and a second inductor L2, as shown in FIG. 6B.

According to the above descriptions, in the protection module of the present invention, the decoupling component in combination with the protection element can provide the overvoltage protection function without affecting the signal transmission. When a device or an apparatus is connected to the output interface of the protection module through twisted pairs, the decoupling component can effectively limit the voltage appearing on this device or apparatus. Moreover, the decoupling component of the present invention can effectively solve the problem that large parasitic capacitance existing in some protection elements would affect the signal transmission. Additionally, the decoupling component can improve the response speed of on-off type protection elements. Furthermore, for the application of multiple twisted pairs, the decoupling component allows the inrush current to be distributed on each twisted pair relatively evenly, thereby improving the overall current-carrying capability of the protection module.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A protection module for symmetrical twisted pairs, comprising:
   an input interface, having a positive input terminal and a negative input terminal;
   an output interface, having a positive output terminal and a negative output terminal;
   a ground interface, having a ground terminal;

a first protection element;
a decoupling component, having an inductor, a first resistor, a second resistor, a first contact, a second contact, a third contact, a fourth contact and a fifth contact, wherein resistances of the first and second resistors are not changed as currents flowing through the first and the second resistors vary, the inductor and the first resistor are coupled in series between the third contact and the fourth contact, the inductor and the second resistor are coupled in series between the third contact and the fifth contact, the first contact is located between the inductor and the first resistor and directly connected to both of the inductor and the first resistor, the second contact is located between the inductor and the second resistor and directly connected to both of the inductor and the second resistor, the first contact is coupled to the positive input terminal through a first transmission line, the second contact is coupled to the negative input terminal through a second transmission line, the third contact is coupled to the ground terminal through a third transmission line and the first protection element, the fourth contact is coupled to the positive output terminal through a fourth transmission line, and the fifth contact is coupled to the negative output terminal through a fifth transmission line; and
a second protection element, being coupled between the fourth transmission line and the fifth transmission line and being closer to the output interface than the first and second resistors.

2. The protection module of claim 1, wherein the inductor is a coupling inductor.

3. The protection module of claim 2, wherein an inductance of the coupling inductor ranges between 50 microhenry ($\mu$H) and 400 $\mu$H.

4. The protection module of claim 1, wherein the inductor consists of a first inductor and a second inductor, the first inductor and the first resistor are coupled in series between the third contact and the fourth contact, and the second inductor and the second resistor are coupled in series between the third contact and the fifth contact.

5. The protection module of claim 4, wherein inductances of the first inductor and the second inductor range between 50 $\mu$H and 400 $\mu$H.

6. The protection module of claim 1, wherein the first protection element is one of a semiconductor discharge tube, a varistor, a gas discharge tube and a one-way transient voltage suppression (TVS) diode.

7. The protection module of claim 1, wherein the second protection element is a two-way transient voltage suppression diode.

8. The protection module of claim 1, wherein resistances of the first resistor and the second resistor range between 0.5 ohm ($\Omega$) and 20$\Omega$.

* * * * *